US012503673B2

(12) United States Patent
Camire et al.

(10) Patent No.: US 12,503,673 B2
(45) Date of Patent: Dec. 23, 2025

(54) MULTI-LAYER LAUNDRY SHEET

(71) Applicant: Henkel AG & Co. KGaA, Düsseldorf (DE)

(72) Inventors: Casey Elphege Camire, Trumbull, CT (US); Brian Alan Warren, Bowling Green, KY (US); Janet Coope-Epstein, Trumbull, CT (US); Andrew Neal Bernard, Trumbull, CT (US); Maxime Pelletier, Rindge, NH (US)

(73) Assignee: Henkel AG & Co. KGaA, Dusseldorf (DE)

( * ) Notice: Subject to any disclaimer, the term of this patent is extended or adjusted under 35 U.S.C. 154(b) by 310 days.

(21) Appl. No.: 18/083,095

(22) Filed: Dec. 16, 2022

(65) Prior Publication Data

US 2023/0203412 A1 Jun. 29, 2023

Related U.S. Application Data

(60) Provisional application No. 63/294,644, filed on Dec. 29, 2021.

(51) Int. Cl.

| | |
|---|---|
| ***C11D 17/06*** | (2006.01) |
| ***C11D 1/83*** | (2006.01) |
| ***C11D 3/22*** | (2006.01) |
| ***C11D 3/37*** | (2006.01) |
| ***C11D 7/26*** | (2006.01) |
| ***C11D 17/00*** | (2006.01) |

(52) U.S. Cl.

CPC ................ *C11D 17/06* (2013.01); *C11D 1/83* (2013.01); *C11D 7/261* (2013.01); *C11D 7/263* (2013.01); *C11D 17/0034* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 4,948,585 A | | 8/1990 | Schlein | |
| 5,238,587 A | | 8/1993 | Smith et al. | |
| 6,699,826 B1 * | | 3/2004 | Saijo .................... | C11D 3/3942 510/438 |
| 2019/0093057 A1 * | | 3/2019 | Tan ...................... | C11D 3/3753 |
| 2019/0232604 A1 | | 8/2019 | Pratt et al. | |
| 2019/0233779 A1 | | 8/2019 | Tan et al. | |
| 2019/0233780 A1 | | 8/2019 | Huang et al. | |
| 2019/0233781 A1 | | 8/2019 | Sivik et al. | |

(Continued)

FOREIGN PATENT DOCUMENTS

| | | |
|---|---|---|
| KR | 20100096985 A | 9/2010 |
| KR | 20140100716 A | 8/2014 |

(Continued)

*Primary Examiner* — Lorna M Douyon

(74) *Attorney, Agent, or Firm* — Sterne, Kessler, Goldstein & Fox P.L.L.C.

(57) ABSTRACT

The present disclosure provides water soluble laundry detergent products comprising one or more non-fibrous sheets and at least one solid layer, wherein the at least one solid layer comprises a gel and a solidifying agent and is coated on one or more sides of the one or more non-fibrous sheets, is disposed between two or more of the non-fibrous sheets, or a combination thereof; and methods of their making and using.

19 Claims, 11 Drawing Sheets

Top View and Side View of Water Soluble Laundry Detergent Product

(56) References Cited

U.S. PATENT DOCUMENTS

| | | | |
|---|---|---|---|
| 2019/0233782 | A1 | 8/2019 | Sivik et al. |
| 2019/0233783 | A1 | 8/2019 | Sivik et al. |
| 2019/0233784 | A1 | 8/2019 | Sivik et al. |
| 2019/0233785 | A1 | 8/2019 | Sivik et al. |
| 2019/0234023 | A1 | 8/2019 | Pratt et al. |

FOREIGN PATENT DOCUMENTS

| | | | | |
|---|---|---|---|---|
| KR | 101444423 | B1 | 9/2014 | |
| WO | WO-2007120867 | A2 * | 10/2007 | ........... C11D 17/041 |

* cited by examiner

FIG. 1: Top View and Side View of Water Soluble Laundry Detergent Product

MULTI-LAYER LAUNDRY SHEET

CROSS REFERENCE TO RELATED APPLICATIONS

This application claims the priority benefit of U.S. Provisional Application No. 63/294,644, filed Dec. 29, 2021, which is hereby incorporated by reference herein in its entirety.

BACKGROUND OF THE INVENTION

Field of the Invention

This application relates to a single or multi-layer laundry detergent sheet for laundry application, as well as its use and manufacture.

Description of the Related Art

The interest in laundry sheets has been growing over the years. Consumers prefer them for their ease-of-use and natural/sustainable approach to laundry. One of the draw backs of current laundry sheets is their cleaning performance. It has been a challenge to create a laundry sheet with the same cleaning performance as a single dose laundry detergent pac. The sheet is often thin and may be aerated to improve dissolution. However, these two characteristics lead to a small concentration of surfactant delivered during the wash cycle and poor cleaning performance.

To improve the cleaning performance of a laundry sheet, a solid, concentrated surfactant composition is herein described which is used to coat the laundry sheet as a solid layer or as a solid layer between and/or coating multiple sheets bound together.

The solid layer in the disclosed water soluble laundry detergent product serves a dual purpose: 1) delivering a high dose of surfactant in the wash, and 2) binding the laundry sheets together. The disclosed water soluble laundry detergent product maximizes the concentration of surfactant in the solid layer while avoiding plasticization/dissolution of the non-fibrous sheet upon contact with the solid layer, maintaining a dissolution rate appropriate for a wash cycle, maintaining adhesion of the solid layer to the laundry sheet and providing good cleaning performance.

Thus, there is a need for a laundry detergent sheet that can effectively deliver the same cleaning performance as a single dose laundry detergent pac to textiles during a wash cycle.

BRIEF SUMMARY OF THE INVENTION

The various aspects, embodiments, and products provided in present disclosure are exemplary and are not intended to limit the scope of the claimed embodiments.

In some aspects, provided herein is a water soluble laundry detergent product comprising one or more non-fibrous sheets and at least one solid layer. In some aspects, the at least one solid layer comprises a gel and a solidifying agent and is coated on one or more sides of the one or more non-fibrous sheets, is disposed between two or more of the non-fibrous sheets, or a combination thereof; the gel is present in an amount of from about 20% to about 80% by weight of the solid layer, and the solidifying agent is present in an amount of from about 10% to about 80% by weight of the solid layer; wherein the gel comprises one or more surfactants; and wherein the solidifying agent is solid at room temperature, has a melting point of about 50° C. or higher, and is water soluble.

In some aspects, the gel is present in an amount of from about 65% to about 80% by weight of the solid layer, and the solidifying agent is present in an amount of from about 10% to about 30% by weight of the solid layer.

In some aspects, the gel comprises from about 40% to about 80% by weight of one or more surfactants.

In some aspects, the one or more surfactants is selected from anionic surfactants, non-ionic surfactants, and mixtures thereof.

In some aspects, the solidifying agent is selected from sodium acetate, sodium stearate, EO/PO block copolymers, fatty alcohol ethoxylate, one or more polyethylene glycols, dibenzylidene sorbitol and combinations thereof.

In some aspects, the solidifying agent is chosen from the group consisting of fatty alcohols, fatty acids, dibenzylidene sorbitol, dibenzylidene sorbitol acetate, sodium tallowate, sodium palmitate, sodium cocoate, sodium stearate, alcohol ethoxylates, fatty acid alkanolamides, alkyl polyglucosides, polyoxyethylene cetyl ethers, polyoxyethylene oleyl ethers, polyoxyethylene stearyl ethers, polyoxyethylene lauryl ethers, polyoxyethylene isocetyl ethers, polyoxyethylene isostearyl ethers, polyoxyethylene octydodecyl ethers, polyoxyethylene behenyl ethers, polyoxyethylene decyltetradecyl ethers, polyoxyethylene chloesteryl ethers, polyoxyethylene-polyoxypropylene ethers, fatty acid monoglycerides, fatty acid triglycerides, polyethylene glycol, polypropylene glycol, polyethyleneglycol monostearates, polyethyleneglycol monooleates, polyethyleneglycol monolaurate, polyoxyethylene hydrogenated castor oils, polyoxyethylene glyceryl monostearates, polyethyleneglycol monoisostearates, polyoxyethylene castor oils, polyoxyethylene cetyl ether stearates, polyoxyethylene stearyl ether stearates, polyoxyethylene lauryl ether stearates, polyoxyethylene lauryl ether isostearates, polyethyleneglycol dilaurates, polyethyleneglycol distearates, polyethyleneglycol diisostearates, polyethyleneglycol dioleates, polyethylene sorbitan fatty acid esters, and polyethylene sorbitan fatty acid esters, and mixtures thereof.

In some aspects, the solidifying agent is polyethylene (100) stearyl ether.

In some aspects, the solidifying agent comprises one or more polyethylene glycols with a weight average molecular weight (g/mol) ranging from about 1000 to about 8000.

In some aspects, the solidifying agent is a polyethylene glycol with an average molecular weight (g/mol) of about 8000.

In some aspects, the solid layer is aerated, contain water-soluble particles, or both.

In some aspects, the product comprises from about 1 to about 20 non-fibrous sheets.

In some aspects, the product has a thickness of from about 0.1 cm to about 3 cm.

In some aspects, the one or more non-fibrous sheets are woven sheets, non-woven sheets, or mixtures thereof.

In some aspects, the one or more non-fibrous sheets are non-woven, water soluble, and comprise polyvinyl alcohol polyvinyl acetate, cellulose, wood pulp, or mixtures thereof.

In some aspects, the one or more non-fibrous sheets comprise one or more ingredients selected from starch, one or more surfactants, enzymes, polymers, chelators, buffers, perfumes, optical brighteners, neutralizers, builders, and mixtures thereof.

In some aspects, the water soluble laundry detergent product has a shape selected from a rectangular shape, a square shape, a circular shape, an oval shape, a hexagon shape, a 2-dimensional bear shape (such as a Snuggle bear, a Teddy bear shape), other 2-dimensional cartoon image shapes of a plant or animal, a shape containing from 3 to 10 sides, and combinations thereof.

In some aspects, the water soluble laundry detergent product is in the form of one or more unit doses. In some aspects, the shape of a unit dose is configured in such a way that the unit dose can be combined with or connected to other unit doses in 2 dimensions to enable a sheet supply format. For example, a unit dose product design of FIGS. 2 and 5 can be combined with or connected to other unit doses in 2 dimensions to form a large sheet as shown in FIGS. 7 and 8, respectively. Such unit dose configurations may also contain products having square, rectangular, and hexagonal shapes.

In some aspects, the water soluble laundry detergent product is folded or rolled.

In some aspects, the water soluble laundry detergent product is perforated.

In some aspects, provided herein is a water soluble laundry detergent product which comprises one or more non-fibrous sheets and at least one solid layer. In some aspects, the at least one solid layer comprises a gel and one or more polyethylene glycols with a weight average molecular weight (g/mol) ranging from about 1000 to about 8000; wherein the at least one solid layer is coated on one or more sides of the one or more non-fibrous sheets, is disposed between two or more of the non-fibrous sheets, or a combination thereof; wherein the gel is present in an amount of from about 50% to about 80% by weight of the solid layer, and the one or more polyethylene glycols is present in an amount of from about 10% to about 50% by weight of the solid layer; and wherein the gel comprises one or more surfactants.

In some aspects, the gel comprises from about 40% to about 80% of one or more surfactants.

In some aspects, the one or more surfactants are selected from anionic surfactants, non-ionic surfactants, and mixtures thereof.

In some aspects, the solid layer is aerated, contain water-soluble particles, or both.

In some aspects, provided herein is a water soluble laundry detergent product comprising two or more non-fibrous sheets and at least one solid layer. In some aspects, the at least one solid layer comprises a gel and one or more polyethylene glycols with a weight average molecular weight (g/mol) ranging from about 1000 to about 8000; wherein the at least one solid layer is coated on one or more sides of the two or more sheets, is disposed between the two or more of the non-fibrous sheets, or a combination thereof; wherein the gel is present in an amount of from about 20% to about 80% by weight of the solid layer, and one or more polyethylene glycols is present in an amount of from about 10% to about 80% by weight of the solid layer; and wherein the gel comprises one or more surfactants.

In some aspects, the gel comprises from about 40% to about 80% of one or more surfactants.

In some aspects, the polyethylene glycol has a weight average molecular weight (g/mol) of about 8000.

In some aspects, the gel is present in an amount of from about 50% to about 80% by weight of the solid layer, and the polyethylene glycol is present in an amount of from about 10% to about 50% by weight of the solid layer.

In some aspects the product has a dissolution time from about 2 minutes to about 30 minutes.

In some aspects, provided herein is a process for preparing a water soluble laundry detergent product, comprising: a. mixing from about 20% to about 80% by weight of a gel with from about 10% to about 80% by weight of one or more polyethylene glycols to form a mixture; b. adding monoethanolamine to the mixture in an amount of about 3% to about 15% by weight of the gel to form a solid layer; and c. coating one or more sides of one or more non-fibrous sheets with the solid layer. In some aspects, the gel comprises from about 40% to about 80% by weight of one or more surfactants. In some aspects, the one or more polyethylene glycols have a weight average molecular weight (g/mol) ranging from about 1000 to about 8000.

In some aspects, the process further comprises attaching a flat surface of two or more of the coated non-fibrous sheets together.

DETAILED DESCRIPTION OF THE INVENTION

Definitions

Figure 1:
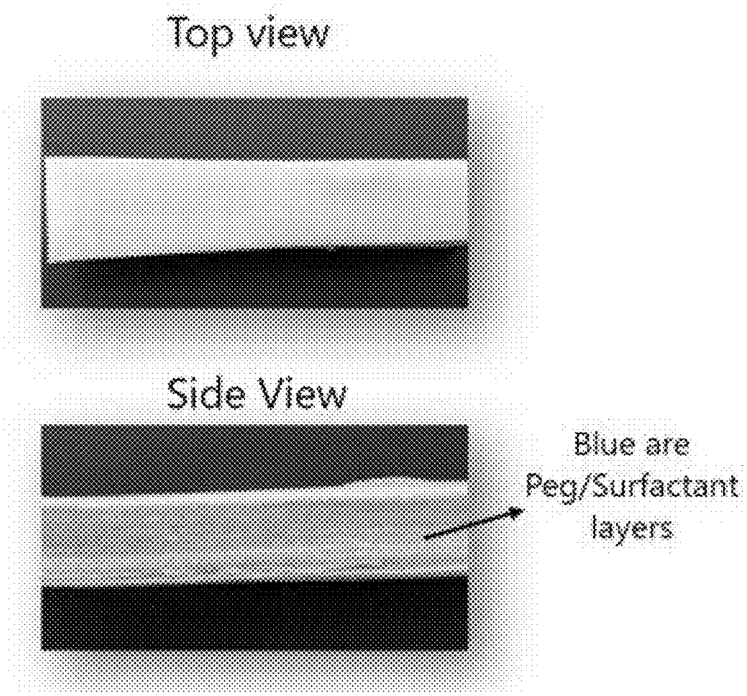
FIG. 1 shows a water soluble laundry detergent product with multiple solid layers (blue) containing a gel and a solidifying agent, disposed between multiple non-fibrous sheets.

All of the various aspects, embodiments, and options disclosed herein can be combined in any and all variants unless otherwise specified. Terms in this application control in the event of a conflict with a patent or publication term that is incorporated by reference.

As used herein, "a," "an," or "the" means one or more unless otherwise specified.

Furthermore, "and/or", where used herein, is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

Open terms such as "include," "including," "contain," "containing" and the like mean "comprising."

The term "or" can be conjunctive or disjunctive.

It is understood that wherever aspects are described herein with the language "comprising," otherwise analogous aspects described in terms of "consisting of" and/or "consisting essentially of" are also provided.

Some inventive embodiments contemplate numerical ranges. Every numerical range provided herein includes the range endpoints as individual inventive embodiments. When a numerical range is provided, all individual values and sub-ranges therein are present as if explicitly written out.

The term "about" includes the recited number ±10%. For example, "about 10" means 9 to 11.

As used herein, the "%" described in the present application refers to the weight percentage unless otherwise indicated.

The term "at least" prior to a number or series of numbers is understood to include the number adjacent to the term "at least," and all subsequent numbers or integers that could logically be included, as clear from context. For example, "at least one non-aqueous solvent" means that 1, 2, 3, or more non-aqueous solvents have the indicated property. When at least is present before a series of numbers or a range, it is understood that "at least" can modify each of the numbers in the series or range. "At least" is also not limited to integers (e.g., "at least 5%" includes 5.0%, 5.1%, 5.18% without consideration of the number of significant figures).

The terms "fragrance" and "perfume" can be used interchangeably.

The terms "process" and "method" can be used interchangeably.

The term "aerating" or "aerate" denotes entrapping or incorporating air or gaseous material into a composition (for example, a solid layer or a sheet as disclosed herein) by any suitable means.

Air or gaseous material is "entrapped" or "incorporated" into a composition (for example, a solid layer or a sheet as disclosed herein) by adding air or gaseous material to the composition while the composition is in a liquid, melted, or molten form.

Water Soluble Laundry Detergent Product

In some aspects, provided herein is a water soluble laundry detergent product comprising one or more non-fibrous sheets and at least one solid layer, wherein the at least one solid layer comprises a gel and a solidifying agent and is coated on one or more sides of the one or more non-fibrous sheets, is disposed between two or more of the non-fibrous sheets, or a combination thereof. In some aspects, the gel is present in an amount of from about 20% to about 80% by weight of the solid layer, and the solidifying agent is present in an amount of from about 10% to about 80% by weight of the solid layer, wherein the gel comprises one or more surfactants, and the solidifying agent is solid at room temperature, has a melting point of about 50° C. or higher, and is water soluble.

In some aspects, provided herein is a water soluble laundry detergent product comprising one or more non-fibrous sheets and at least one solid layer, wherein the at least one solid layer comprises a gel and one or more polyethylene glycols with a weight average molecular weight (g/mol) ranging from about 1000 to about 8000. In some aspects, the at least one solid layer is coated on one or more sides of the one or more non-fibrous sheets, is disposed between two or more of the non-fibrous sheets, or a combination thereof, wherein the gel is present in an amount of from about 50% to about 80% by weight of the solid layer, and the one or more polyethylene glycols is present in an amount of from about 10% to about 50% by weight of the solid layer, and wherein the gel comprises one or more surfactants.

In some aspects, provided herein is a water soluble laundry detergent product comprising two or more non-fibrous sheets and at least one solid layer, wherein the at least one solid layer comprises a gel and one or more polyethylene glycols with a weight average molecular weight (g/mol) ranging from about 1000 to about 8000. In some aspects, the at least one solid layer is coated on one or more sides of the two or more sheets, is disposed between the two or more of the non-fibrous sheets, or a combination thereof, the gel is present in an amount of from about 20% to about 80% by weight of the solid layer, and one or more polyethylene glycols is present in an amount of from about 10% to about 80% by weight of the solid layer, and wherein the gel comprises one or more surfactants.

In some aspects, the solid layer comprises a solidifying agent and a gel wherein the gel is present in an amount of from about 10% to about 90% by weight of the solid layer. In some aspects, the gel is present in an amount of from about 20% to about 90%, from about 25% to about 90%, from about 30% to about 90%, from about 35% to about 90%, from about 40% to about 90%, from about 50% to about 90%, from about 65% to about 90%, from about 70% to about 90%, from about 10% to about 80%, from about 20% to about 80%, from about 50% to about 80%, from about 65% to about 80%, or from about 25% to about 75% by weight of the solid layer.

In some aspects, the gel is present in an amount of about 10%, about 20%, about 30%, about 40%, about 50%, about 60%, about 70%, about 80%, about 90%, or a range between any two of the preceding values, by weight of the solid layer. In some aspects, the gel is present in an amount of about 25%, about 50%, or about 75% by weight of the solid layer. In some aspects, the gel is present in an amount of about 75% by weight of the solid layer.

In some aspects, the gel comprises one or more surfactants. In some aspects, the one or more surfactants include, but are not limited to, anionic surfactants, nonionic surfactants, cationic surfactants, ampholytic surfactants, zwitterionic surfactants, and mixtures thereof. In some aspects, the one or more surfactants are selected from anionic surfactants, non-ionic surfactants, and mixtures thereof. In some aspects, the one or more surfactants are anionic surfactants. In some aspects, the one or more surfactants are non-ionic surfactants. In some aspects, the one or more surfactants are cationic surfactants.

In some aspects, the gel comprises from about 30% to about 90% by weight of one or more surfactants. In some aspects, the gel comprises from about 40% to about 90%, about 45% to about 90%, about 50% to about 90%, about 55% to about 90%, about 60% to about 90%, about 30% to about 80%, about 30% to about 70%, about 30% to about 60%, or about 40% to about 80% by weight of one or more surfactants.

In some aspects, the gel comprises about 30%, about 40%, about 50%, about 60%, about 70%, about 80%, about 90%, or a range between any two of the preceding values, by weight of one or more surfactants.

In some aspects, the solid layer comprises a solidifying agent wherein the solidifying agent is present in an amount of from about 10% to about 90%, from about 10% to about 80%, from about 10% to about 70%, from about 10% to about 75%, from about 10% to about 60%, from about 10% to about 65%, from about 10% to about 55%, from about 10% to about 50%, from about 10% to about 45%, from about 15% to about 50%, from about 15% to about 40%, or from about 15% to about 30%, by weight of the solid layer.

In some aspects, the solidifying agent is present in an amount of about 10%, about 20%, about 30%, about 40%, about 50%, about 60%, about 70%, about 80%, about 90%, or a range between any two of the preceding values, by weight of the solid layer. In some aspects, the solidifying agent is present in an amount of about 25%, about 50%, or about 75% by weight of the solid layer. In some aspects, the solidifying agent is present in an amount of about 25% by weight of the solid layer.

In some aspects, the solidifying agent is selected from sodium acetate, sodium stearate, block copolymers, one or more polyethylene glycols and combinations thereof. In some aspects, the solidifying agent is sodium acetate. In some aspects, the solidifying agent is sodium stearate. In some aspects, the solidifying agent is one or more block copolymers. In some aspects, the solidifying agent is one or more ethylene oxide/propylene oxide (EO/PO) block copolymers. In some aspects, the solidifying agent is one or more polyethylene glycols.

In some aspects, the solidifying agent comprises one or more polyethylene glycols with a weight average molecular weight (g/mol) ranging from about 1000 to about 10,000, about 1000 to about 9000, about 2000 to about 9000, about 3000 to about 9000, about 4000 to about 9000, about 5000 to about 9000, about 6000 to about 9000, about 1000 to about 8000, about 2000 to about 8000, about 4000 to about 8000, about 6000 to about 8000.

In some aspects, the solidifying agent comprises one or more polyethylene glycols with a weight average molecular weight of about 1000, about 2000, about 3000, about 4000, about 5000, about 6000, about 7000, about 8000, about 9000, or a range between any two of the preceding values. In some aspects, the one or more polyethylene glycols have a weight average molecular weight of about 1000, or about 4000, or about 8000.

In some aspects is provided a water soluble laundry detergent product having a gel and a solidifying agent wherein the solidifying agent comprises one or more polyethylene glycols with a weight average molecular weight (g/mol) of 8000.

In some aspects is provided a water soluble laundry detergent product having a gel and a solidifying agent wherein the solidifying agent comprises one or more polyethylene glycols with a weight average molecular weight (g/mol) of 4000.

In some aspects, the solid layer comprises one or more polyethylene glycols wherein the one or more polyethylene glycols is present in an amount of from about 10% to about 90%, from about 10% to about 80%, from about 10% to about 75%, from about 10% to about 70%, from about 10% to about 65%, from about 10% to about 60%, from about 10% to about 55%, from about 10% to about 50%, from about 10% to about 45%, from about 10% to about 40%, from about 10% to about 35%, from about 10% to about 30%, from about 15% to about 50%, from about 15% to about 40%, or from about 15% to about 30%, by weight of the solid layer.

In some aspects, the one or more polyethylene glycols is present in an amount of about 10%, about 20%, about 30%, about 40%, about 50%, about 60%, about 70%, about 80%, about 90%, or a range between any two of the preceding values, by weight of the solid layer. In some aspects, the one or more polyethylene glycols is present in an amount of about 25%, about 50%, or about 75% by weight of the solid layer. In some aspects, the one or more polyethylene glycols is present in an amount of about 25% by weight of the solid layer.

In some aspects, the solid layer is aerated, contains water-soluble particles, or both. In some aspects, the solid layer is aerated. In some aspects, the solid layer contains water-soluble particles. In some aspects, the solid layer is both aerated and contains water-soluble particles.

In some aspects, the solidifying agent is a fatty alcohol ethoxylate which is solid at a temperature of under about 45° C.

In other aspects the solidifying agent is polyethylene (100) stearyl ether. In other aspects, the solidifying agent is selected from the group consisting of polyoxyethylene cetyl ethers, polyoxyethylene oleyl ethers, polyoxyethylene stearyl ethers, polyoxyethylene lauryl ethers, polyoxyethylene isocetyl ethers, polyoxyethylene isostearyl ethers, polyoxyethylene octydodecyl ethers, polyoxyethylene behenyl ethers, polyoxyethylene decyltetradecyl ethers, polyoxyethylene chloesteryl ethers, polyoxyethylene polyoxypropylene ethers and mixtures thereof.

In other aspects, the solidifying agent is selected from the group consisting of sorbitan fatty acid esters, fatty acid monoglycerides, fatty acid triglycerides, propylene glycol fatty acid esters, ethylene glycol fatty acid esters, and mixtures thereof.

In other aspects, the solidifying agent is selected from the group consisting of polyethyleneglycol monostearates, polyethyleneglycol monooleates, polyethyleneglycol monolaurate, polyoxyethylene hydrogenated castor oils, polyoxyethylene glyceryl monostearates, polyethyleneglycol monoisostearates, polyoxyethylene castor oils, polyoxyethylene cetyl ether stearates, polyoxyethylene stearyl ether stearates, polyoxyethylene lauryl ether stearates, polyoxyethylene lauryl ether isostearates, polyethyleneglycol dilaurates, polyethyleneglycol di stearates, polyethyleneglycol diisostearates, polyethyleneglycol dioleates, polyethylene sorbitan fatty acid esters, and polyethylene sorbitan fatty acid esters, and mixtures thereof.

In some aspects, the solidifying agent is a mixture of one or more of the solidifying agents disclosed herein.

In some aspects, the water soluble laundry detergent product comprises from about 1 to about 30, from about 1 to about 25, from about 1 to about 22, from about 1 to about 20, from about 1 to about 18, from about 1 to about 15, from about 1 to about 12, from about 1 to about 10, from about 1 to about 8, from about 1 to about 5, from about 1 to about 3, non-fibrous sheets.

In some aspects, the water soluble laundry detergent product comprises about 1, about 5, about 10, about 15, about 20, about 25, about 30, or a range between any two of the preceding values, non-fibrous sheets. In some aspects, the water soluble laundry detergent product comprises 1 sheet. In some aspects, the water soluble laundry detergent product comprises 2 sheets. In some aspects, the water soluble laundry detergent product comprises 5 sheets. In some aspects, the water soluble laundry detergent product comprises 10 sheets. In some aspects, the water soluble laundry detergent product comprises 15 sheets. In some aspects, the water soluble laundry detergent product comprises 20 sheets.

In another aspect, the one or more non-fibrous sheets are woven sheets, non-woven sheets, and mixtures thereof. In some aspects, the one or more non-fibrous sheets are woven sheets. In some aspects, the one or more non-fibrous sheets are non-woven sheets.

In some aspects, the one or more non-fibrous sheets can comprise water soluble polymers. In some aspects, the one or more non-fibrous sheets can comprise water soluble polymers selected from the group consisting of polyvinyl alcohols, polyvinylpyrrolidones; polyalkylene oxides, polyacrylates, caprolactams, polymethacrylates, polymethylmethacrylates, polyacrylamides, polymethylacrylamides, polydimethylacrylamides, polyethylene glycol monomethacrylates, copolymers of acrylic acid and methyl acrylate, polyurethanes, polycarboxylic acids, polyvinyl acetates, polyesters, polyamides, polyamines, polyethyleneimines, maleic/(acrylate or methacrylate) copolymers, copolymers of methylvinyl ether and of maleic anhydride, copolymers of vinyl acetate and crotonic acid, copolymers of vinylpyrrolidone and of vinyl acetate, copolymers of vinylpyrrolidone and of caprolactam, vinyl pyrollidone/vinyl acetate copolymers, copolymers of anionic, cationic and amphoteric monomers, and mixtures thereof.

In some aspects, the one or more non-fibrous sheets can comprise polyvinyl alcohol, starch, one or more surfactants, enzymes, polymers, chelators, buffers, perfumes, optical brighteners, polyethyleneimine ethoxylate, neutralizers, such as monoethanolamine and triethanolamine, and builders, such as zeolite, silica, sodium carbonate, sodium silicate, and mixtures thereof.

In some aspects, the one or more non-fibrous sheets can comprise polyvinyl alcohol. In some aspects, the one or more sheets comprise polyvinyl alcohol and one or more ingredients selected from starch, one or more surfactants, enzymes, polymers, chelators, buffers, perfumes, optical brighteners, neutralizers, builders, and mixtures thereof.

In some aspects, the one or more non-fibrous sheets are aerated. In some aspects, the one or more non-fibrous sheets are porous sheets with open-celled foam structures characterized by a percent open cell content of from about 80% to 100%.

In some aspects, the one or more non-fibrous sheets can comprise a solid particulate detergent.

In some aspects, the one or more non-fibrous sheets are aerated, contain water-soluble particles, or both.

In some aspects, the one or more non-fibrous sheets can comprise one or more surfactants selected from the group consisting of anionic surfactants, nonionic surfactants, cationic surfactants, zwitterionic surfactants, amphoteric surfactants, polymeric surfactants, and mixtures thereof.

In some aspects, the one or more non-fibrous sheets comprise a surfactant system, sodium carbonate, sodium percarbonate, citric acid, sodium silicate, or any combination thereof. In some aspects, the surfactant system comprises sodium alkyl benzene sulphate and alcohol ethoxylate.

In some aspects, the one or more non-fibrous sheets comprise sodium carbonate, sodium percarbonate, sodium alkyl benzene sulphate, C 13-15 alcohol ethoxylate (5E0), citric acid anhydrous, C12/13-15 alcohol ethoxylate (7E0), and sodium silicate, or any combination thereof.

In some aspects, the one or more non-fibrous sheets comprise a fragrance and/or a dye transfer inhibitor. In some aspects, the fragrance is a neat fragrance (i.e., a free oil), or an encapsulated fragrance (e.g. melamineformaldehyde encapsulates).

In some aspects, the fragrance is present in an amount of from about 0.1% to about 10%, or from about 0.5 wt % to about 10.0 wt %, or from about 0.5 wt % to about 8.0 wt %, or from about 0.5 wt % to about 7.5 wt %, or from about 0.5 wt % to about 5.0 wt %, based on the total weight of the one or more sheets.

In some aspects, the one or more non-fibrous sheets further comprises at least one additional agent selected from the group consisting of: an anti-wrinkling agent, an odor capturing agent, a fiber protection agent, a color protection agent, a soil releasing agent, an anti-redeposition agent, an optical brightening agent, a UV protection agent, an antipilling agent, a water repellency agent, a disinfecting and/or sanitizing agent, a souring agent, a repellent, and mixtures thereof. The one or more sheets can optionally include detergent components. In some aspects, suitable detergent components include, nonionic surfactants, anionic surfactants, cationic surfactants, zwitterionic surfactants, polymer dispersants, builders, oxidizing agents, biocidal agents, foam regulators, bleach activators, catalysts, thickeners, other stabilizers, fragrances, soil suspending agents, brighteners, enzymes, UV protectors, salts, water, inert ingredients, and mixtures thereof.

In some aspects, the water soluble laundry detergent product delivers approximately the same cleaning performance as a commercial unit dose laundry detergent product, such as 'all free clear Mighty Pacs.

In some aspects, the water soluble laundry detergent product solubilizes within the time of a standard wash cycle.

In some aspects, the water soluble laundry detergent product is solid at about 25° C. and has a melting point of about 50° C. or higher, and is water soluble.

In some aspects, the water soluble laundry detergent product dissolves in water at room temperature in from about 2 to about 40 minutes. In some aspects, the water soluble laundry detergent product dissolves in water at room temperature in about 2 to about 30 minutes, in about 5 to about 10 minutes, from about 5 to about 15 minutes, from about 5 to about 20 minutes, from about 5 to about 25 minutes, from about 5 to about 30 minutes, from about 5 minutes to about 35 minutes, from about 5 minutes to about 40 minutes, from about 10 to about 30 minutes, or from about 10 to about 25 minutes.

In some aspects, the water soluble laundry detergent product dissolves in water at room temperature in about 2 minutes, about 5 minutes, about 8 minutes, about 10 minutes, about 12 minutes, about 15 minutes, about 18 minutes, about 20 minutes, about 25 minutes, about 30 minutes, about 40 minutes, or a range between any two of the preceding values. In some aspects, the water soluble laundry detergent product has a dissolution time of about 15 minutes. In some aspects, the water soluble laundry detergent product has a dissolution time of less than about 40 minutes.

In some aspects, the water soluble laundry detergent product has one or more non-fibrous sheets and at least one solid layer.

In some aspects, the water soluble laundry detergent product has one or more non-fibrous sheets and at least one solid layer wherein the solid layer is coated on one side of a non-fibrous sheet.

In some aspects, the water soluble laundry detergent product has two or more non-fibrous sheets and at least one solid layer wherein the solid layer is disposed between two or more non-fibrous sheets.

In some aspects, the water soluble laundry detergent product has two or more non-fibrous sheets and at least one solid layer wherein the solid layer is coated on one side of a non-fibrous sheet and is disposed between two or more non-fibrous sheets.

In some aspects, the water soluble laundry detergent product has one or more non-fibrous sheets and at least one solid layer, wherein the solid layer is coated on two sides of one or more non-fibrous sheet.

In some aspects, the water soluble laundry detergent product has one or more non-fibrous sheets and at least one solid layer, wherein the solid layer is coated on two sides of one or more non-fibrous sheets and is disposed between two or more non-fibrous sheets.

In some aspects, the water soluble laundry detergent product has one or more non-fibrous sheets and at least one solid layer, wherein the solid layer is coated on one or more sides of the one or more non-fibrous sheets, is disposed between two or more of the non-fibrous sheets, or combinations thereof.

In some aspects, the water soluble laundry detergent product has a thickness of from about 0.1 cm to about 5 cm. In some aspects, the water soluble laundry detergent product has a thickness of from about 0.1 cm to about 3 cm. In some aspects, the water soluble laundry detergent product has a thickness of from about 0.2 cm to about 3 cm, from about 0.3 cm to about 3 cm, from about 0.4 cm to about 3 cm, from about 0.5 cm to about 3 cm, from about 0.6 cm to about 3 cm, from about 0.7 cm to about 3 cm, from about 0.8 cm to about 3 cm, from about 0.9 cm to about 3 cm, from about 1 cm to about 3 cm, from about 1.2 cm to about 3 cm, from about 1.4 cm to about 3 cm, from about 1.6 cm to about 3 cm, from about 1.8 cm to about 3 cm, from about 2 cm to about 3 cm, from about from about 2.2 cm to about 3 cm, from about 2.4 cm to about 3 cm, from about 2.6 cm to about 3 cm, or from about 2.8 cm to about 3 cm.

In some aspects, the water soluble laundry detergent product has a thickness of about 0.1 cm, about 0.2 cm, about 0.5 cm, about 1.0 cm, about 1.5 cm, about 2.0 cm, about 2.5 cm, about 3 cm, or a range between any two of the preceding values.

In some aspects, the water soluble laundry detergent product is flexible and can be rolled or folded. In some aspects, the rolled product is in the form a conventional paper towel roll format with perforations between each individual sheet, such that a sheet can be easily dispensed from the roll for use. In some aspects, one or more unit doses of the water soluble laundry detergent product can be separated or torn from a rolled product from the exterior of the rolled product. In some aspects, one or more unit doses of the water soluble laundry detergent product can be separated or torn from a rolled product from the interior of the rolled product. In some aspects, one or more unit doses of the water soluble laundry detergent product can be separated or torn from a rolled product from the top or end of the rolled product. In some aspects, one or more unit doses of the water soluble laundry detergent product can be separated or torn from a rolled product from the middle of the rolled product. In some aspects, one or more unit doses of the water soluble laundry detergent product can be separated or torn from a rolled product from the bottom or beginning of the rolled product.

Figure 10:
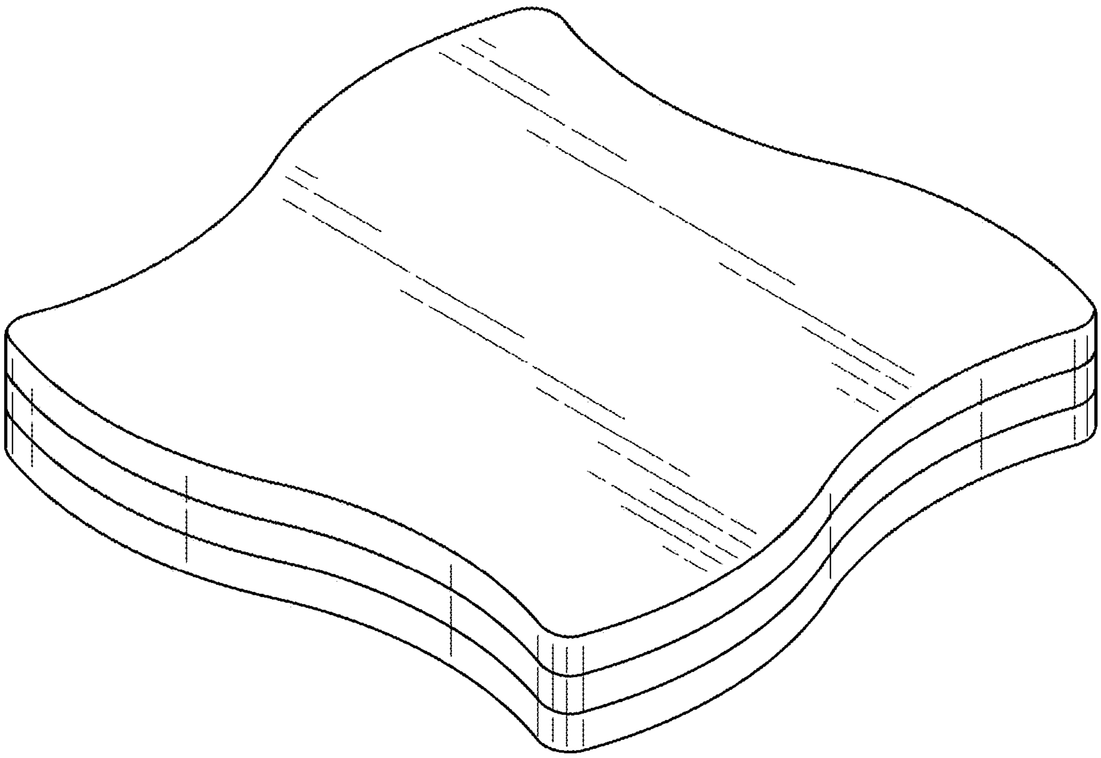
FIG. 10 shows a perspective view of three stacked water soluble laundry detergent product having curved edges.
Figure 11:
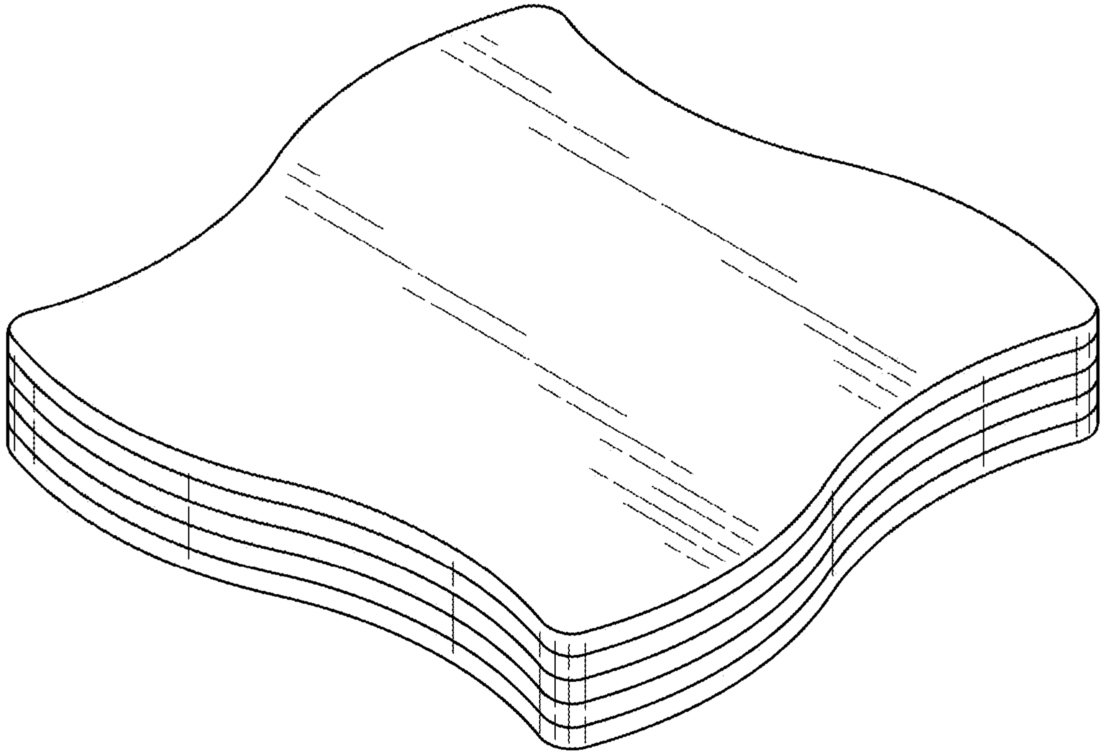
FIG. 11 shows a perspective view of five stacked water soluble laundry detergent product having curved edges.

In other aspects, each unit dose or sheet, optionally folded, is stacked on top of the other, as shown in FIGS. 10 and 11. In some aspects, one or more unit doses of the water soluble laundry detergent product can be pulled from the top of a stack of unit doses. In some aspects, one or more unit doses of the water soluble laundry detergent product can be pulled from the middle of a stack of unit doses. In some aspects, one or more unit doses of the water soluble laundry detergent product can be pulled from the bottom of a stack of unit doses. In some preferred aspects, each unit dose or sheet is folded in a Z-form, whereas multiple sheets of such Z-form are stacked in a dispensing box in such a way that pulling out one sheet will lead to an easy pulling of another sheet from the box. In some aspects, the water soluble laundry detergent product is not flexible and cannot be rolled or folded.

Figure 2:
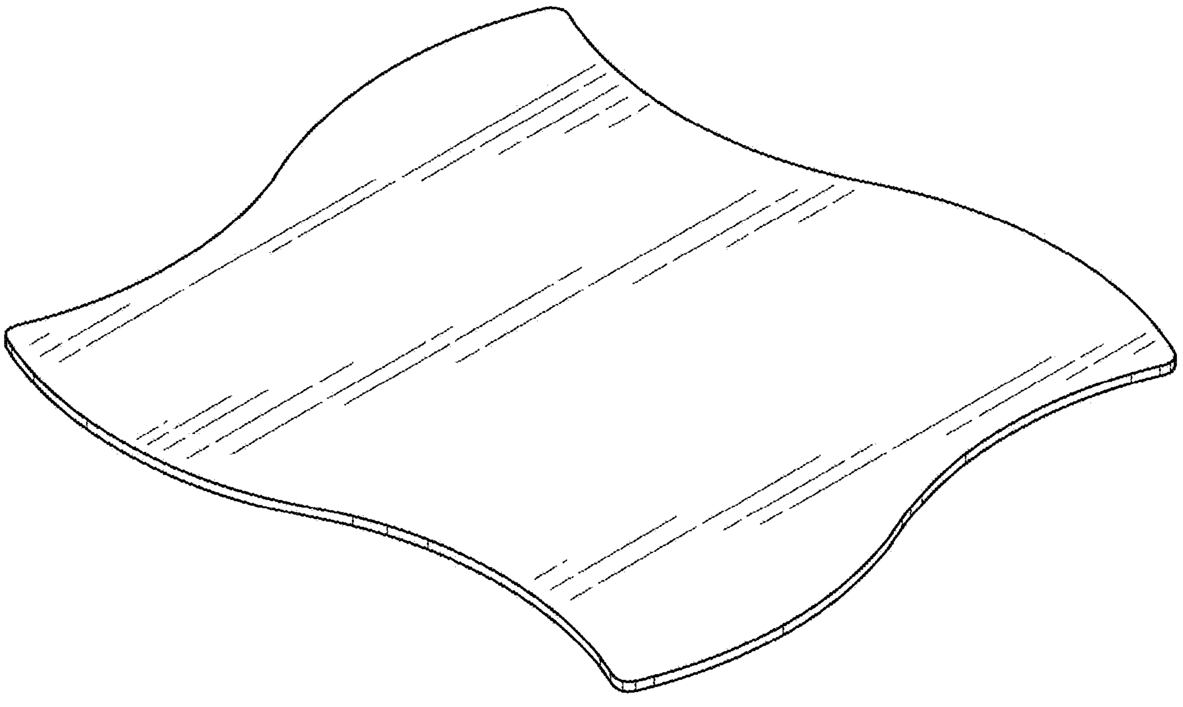
FIG. 2 shows a perspective view of a water soluble laundry detergent product having curved edges.
Figure 3:
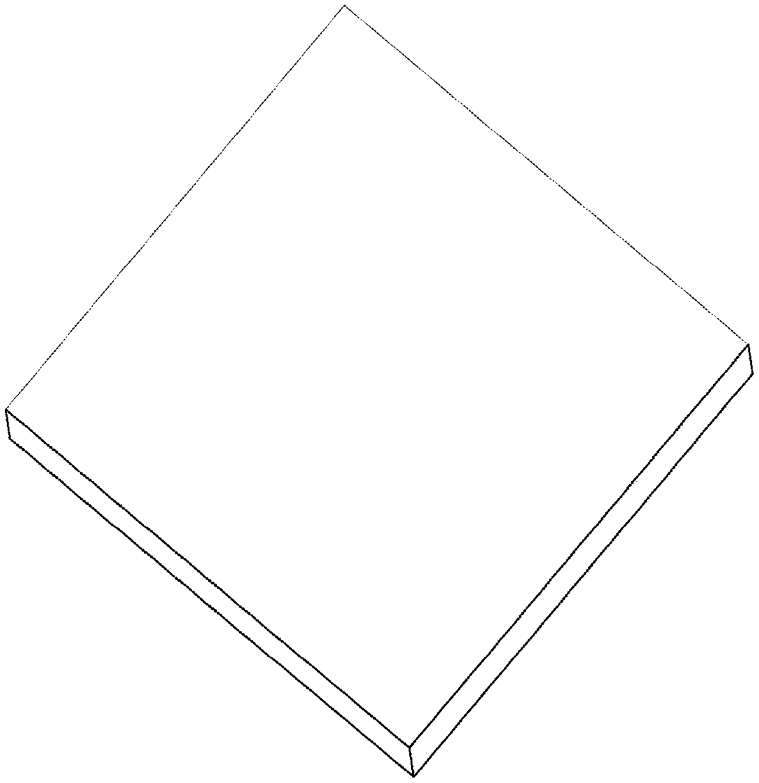
FIG. 3 shows a perspective view of a water soluble laundry detergent product that has straight edges and is in the shape of a square.
Figure 4:
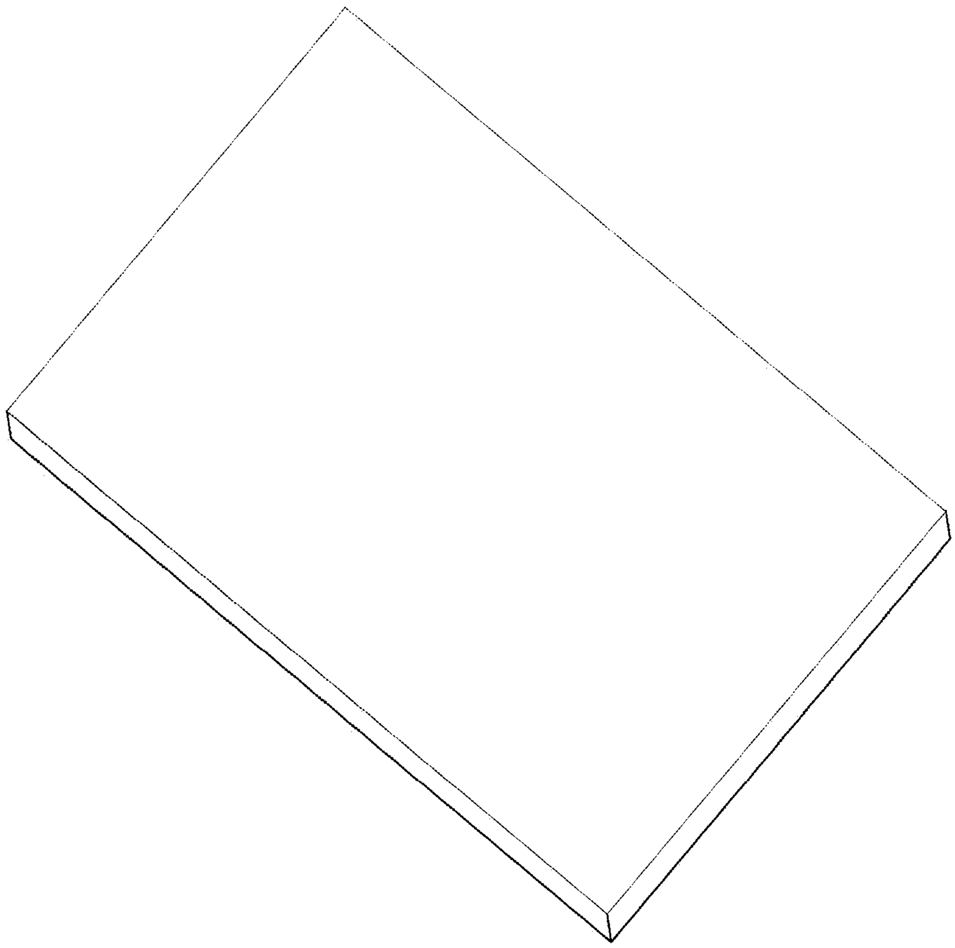
FIG. 4 shows a perspective view of a water soluble laundry detergent product that has straight edges and is in the shape of a rectangle.
Figure 5:
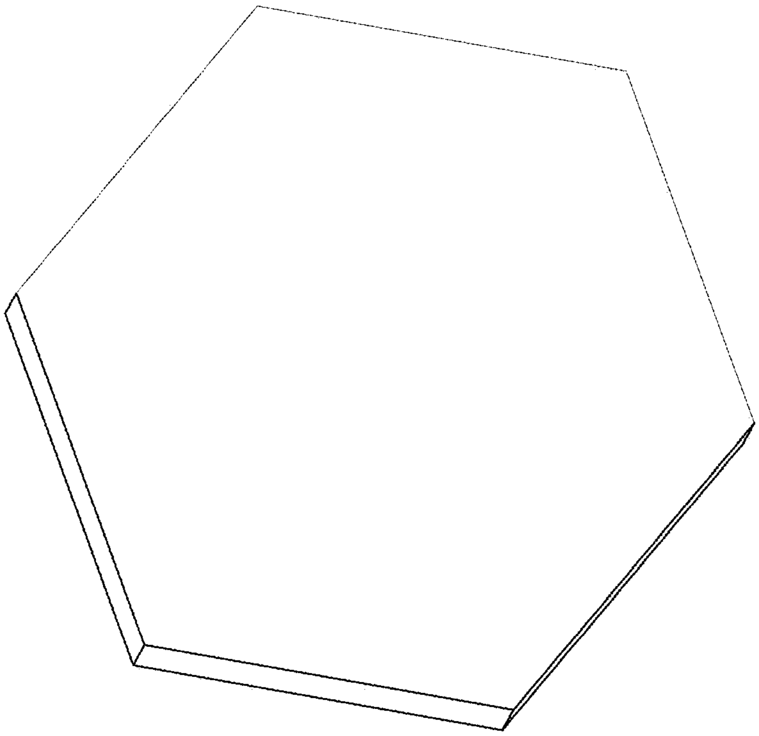
FIG. 5 shows a perspective view of a water soluble laundry detergent product that has straight edges and is in the shape of a hexagon.

In some aspects, the water soluble laundry detergent product has any shape or size. In some aspects, the water soluble laundry detergent product has a particular shape. In some aspects, the water soluble laundry detergent product has a shape having straight edges, for example, as shown in FIGS. 3-5. In some aspects, the water soluble laundry detergent product has a shape having curved edges, for example, as shown in FIG. 2. In some aspects, the water soluble laundry detergent product has a shape having straight edges and curved edges. In some aspects, the water soluble laundry detergent product has a shape having from 3 to 12 sides. In some aspects, the water soluble laundry detergent product has a shape having from 3 to 10 sides. In some aspects, the water soluble laundry detergent product has a shape having from 3 to 8 sides. In some aspects, the water soluble laundry detergent product has a shape having from 3 to 6 sides.

Figure 6:
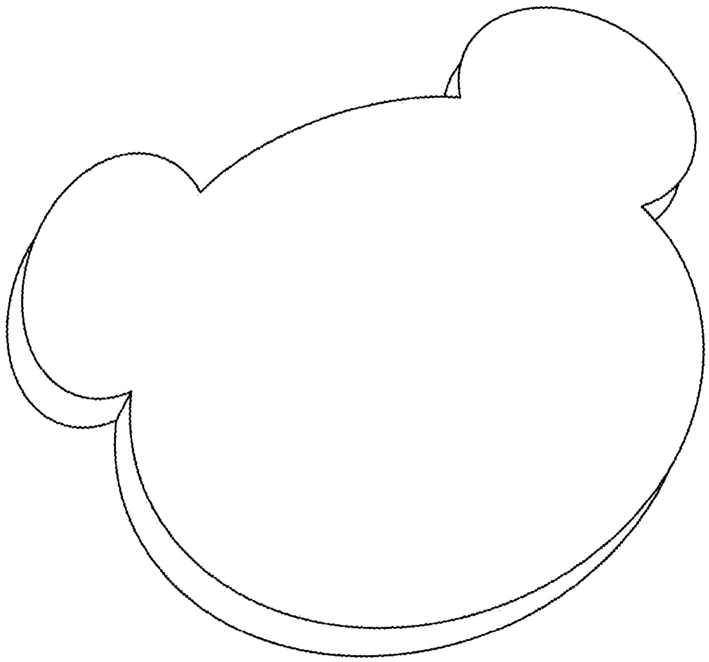
FIG. 6 shows a perspective view of a water soluble laundry detergent product that is in the shape of a bear.

In some aspects, the water soluble laundry detergent product has a shape selected from a rectangular shape, for example, as shown in FIG. 4, a square shape, for example, as shown in FIG. 3, a circular shape, an oval shape, a hexagon shape, for example, as shown in FIG. 5, a 2-dimensional bear shape (such as a Snuggle bear, a Teddy bear shape), for example, as shown in FIG. 6, other 2-dimensional cartoon image shapes of a plant or animal, a shape containing from 3 to 10 sides, and combinations thereof. In some aspects, the water soluble laundry detergent product has a shape that maximizes the exposed surface area of the solid layer.

Figure 7:
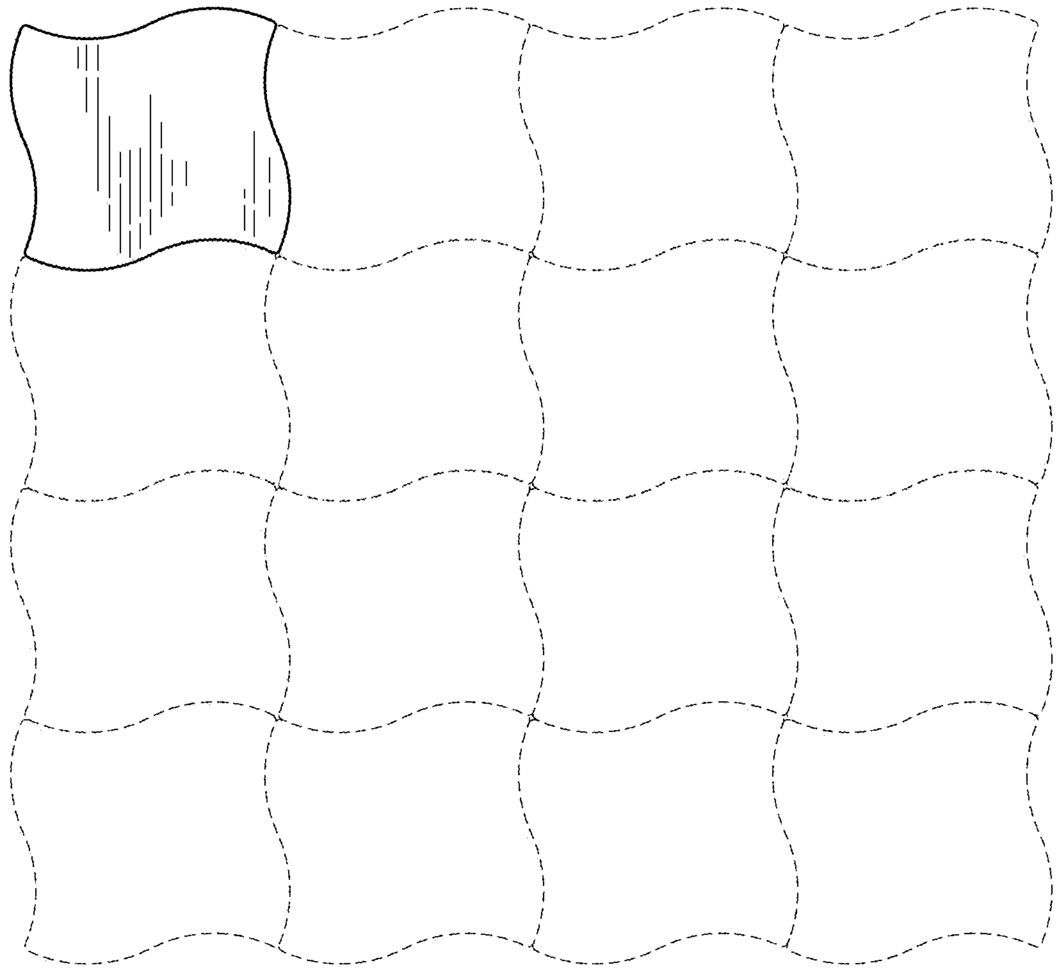
FIG. 7 shows a top view of multiple unit doses of a water soluble laundry detergent product having curved edges that are connected together and perforated for tearing.
Figure 8:
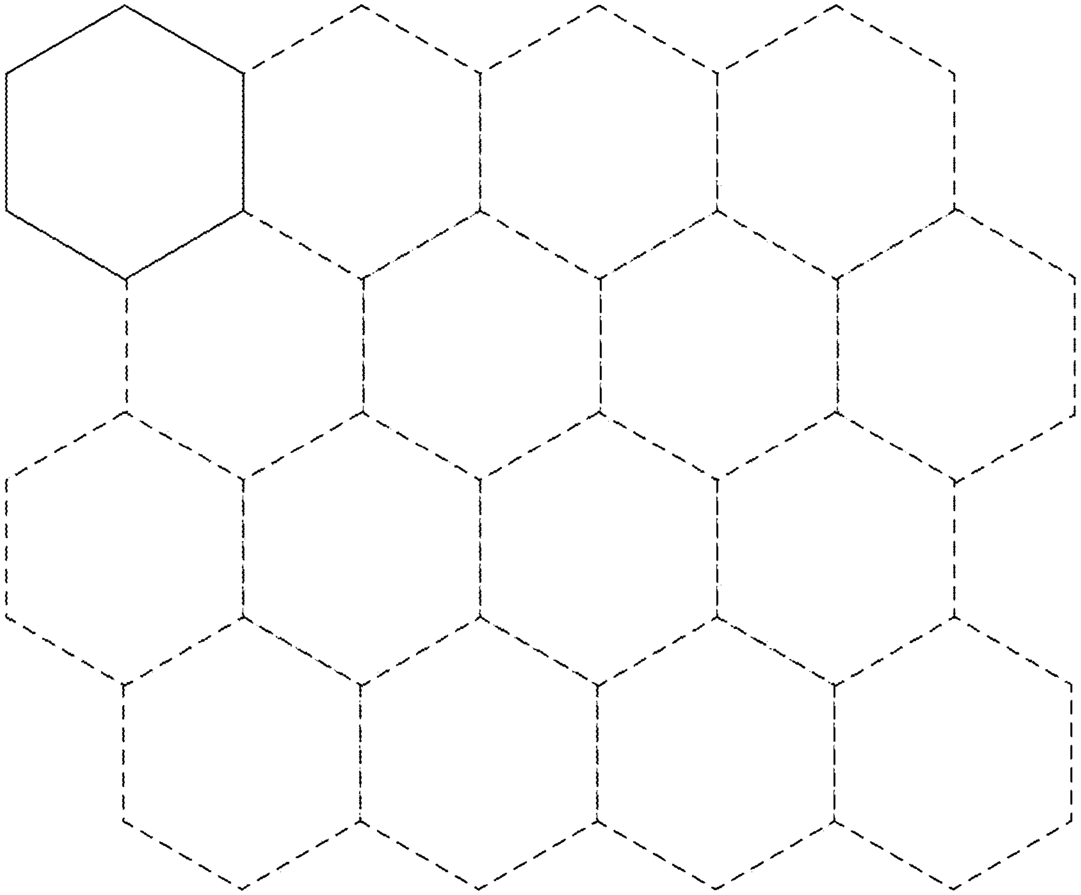
FIG. 8 shows a top view of multiple unit doses of a water soluble laundry detergent product having hexagon shapes that are connected together and perforated for tearing.
Figure 9:
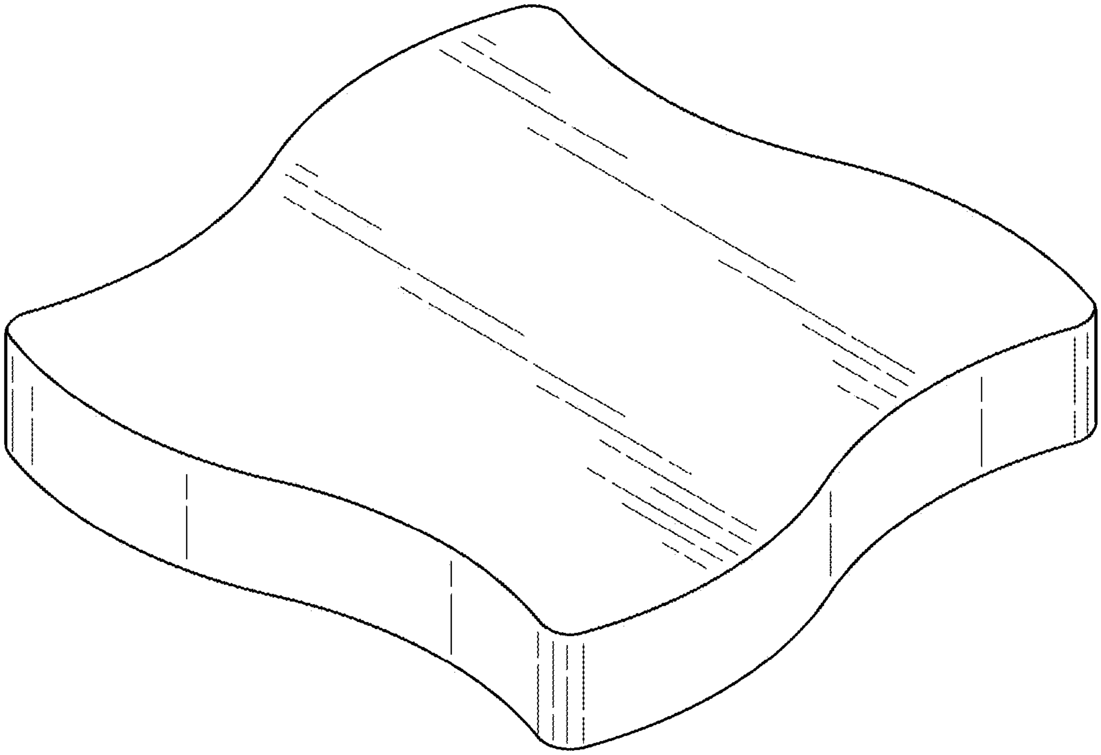
FIG. 9 shows a perspective view of a water soluble laundry detergent product having curved edges and increased thickness.

In some aspects, the water soluble laundry detergent product is in the form of one or more unit doses. In some aspects, the shape of a unit dose is configured in such a way that the unit dose can be combined with or connected to other unit doses in 2 dimensions to enable a sheet supply format. For example, a unit dose product design of FIGS. 2 and 5 can be combined with or connected to other unit doses in 2 dimensions to form a large sheet as shown in FIGS. 7 and 8, respectively. Such unit dose configurations may also contain products having square, rectangular, and hexagonal shapes.

In some aspects, the water soluble laundry detergent product has a flat orientation, such that the product lays flat on a surface. In some aspects, the water soluble laundry detergent product has an orientation that is not flat, such that the product does not lay flat on a surface.

In some aspects, the water soluble laundry detergent product is folded one or more times. The water soluble laundry detergent product can be folded in any manner known to a person of skill in the art. In some aspects, the water soluble laundry detergent product is folded between 1 and 10 times. In some aspects, the water soluble laundry detergent product is folded 1 time. In some aspects, the water soluble laundry detergent product is folded 2 times. In some aspects, the water soluble laundry detergent product is folded 4 times. In some aspects, the water soluble laundry detergent product is folded 6 times. In some aspects, the water soluble laundry detergent product is folded 8 times. In some aspects, the water soluble laundry detergent product is folded 10 times.

In some aspects, the water soluble laundry detergent product is rolled. In some aspects, the water soluble laundry detergent product is rolled into a cylindrical shape. In some aspects, the water soluble laundry detergent product is perforated. In some aspects, the perforation allows for separation and/or removal of individual units doses of the water soluble laundry detergent product. In some aspects, the water soluble laundry detergent product is rolled and is perforated. In some aspects, the separation and/or removal of individual unit doses of the water soluble laundry detergent product occurs after unrolling the water soluble laundry detergent product. In some aspects, the water soluble laundry detergent product is contour cut.

In some aspects, the water soluble laundry detergent product is prepared in a shape, rolled, and/or folded as described herein to improve manufacturing processes of the water soluble laundry detergent product. In some aspects, the water soluble laundry detergent product is prepared in a shape, rolled, and/or folded as described herein to improve packing and storage of the water soluble laundry detergent product. In some aspects, the water soluble laundry detergent product is prepared in a shape, rolled, and/or folded as described herein to improve dissolution of the water soluble laundry detergent product.

In some aspects, the water soluble laundry detergent product is added to a dispenser or container. In some aspects, the dispenser or container can be a box. In some aspects, the water soluble laundry detergent product is present within the dispenser or container in a shape or orientation that allows a consumer to pull one water soluble laundry detergent product as described herein out of the dispenser or container. In some aspects, the water soluble laundry detergent product is perforated and is added to a dispenser or container. In some aspects, the water soluble laundry detergent product is rolled and perforated and is added to a dispenser or container. In some aspects, the rolled and perforated water soluble laundry detergent product is added to a dispenser that allows a consumer to pull one water soluble laundry detergent product as described herein out of the dispenser. In some aspects, the water soluble laundry detergent product is stacked and is added to a dispenser or container. In some aspects, two or more unit doses of the water soluble laundry detergent product is stacked and are added to a dispenser or container.

In some aspects, the water soluble laundry detergent product includes one or more designs, text, pictures, and the like on the surface of the water soluble laundry detergent product. In some aspects, the designs, text, pictures, and the like are added to the water soluble laundry detergent product by processing including, but not limited to, printing, imprinting, embossing, engraving, stamping, Additional Ingredient(s)

In some aspects, the water soluble laundry detergent product further comprises additional ingredient(s) known to be employed in compositions for fabric treatment.

In some aspects the additional ingredient(s) are, for example, a bleaching agent, a bleach activator, a polymer, an enzyme, a silicone oil, an anti-re-deposition agent, an optical brightener, a greying inhibitor, a shrink inhibitor, an anti-creasing agent, a color transfer inhibitor, an anti-microbial, a germicide, a fungicide, an antioxidant, an anti-static agent, an ironing aid, a water proofing agent, an impregnation agent, a swelling agent, an anti-slip agent, a UV absorber, a pH modifier, a corrosion inhibitor, or any combination thereof. In other aspects, the additive is one or more viscosity-modifying agents (e.g., silica, sodium CMC, and other agents well-known in the art to increase or decrease the viscosity of a liquid or liquid-containing suspension), one or more opacifying agents, and the like. In further aspects, the additional ingredient(s) are scavengers, including, for example, chlorine scavengers.

In some aspects the additional ingredient(s) is, for example, a pH modifier. The pH modifiers include, for example, amine bases. Amine bases include, for example, monoethanolamine, triethanolamine, and mixtures thereof.

In some aspects the additional ingredient(s) is, for example, a polymer. The polymers include, for example, polyethylene glycols having a weight average molecular weight (g/mol) ranging from about 100 to about 1000, or mixtures thereof. In some aspects, polyethylene glycol has a weight average molecular weight (g/mol) of about 400.

In some aspects, the additional ingredient(s) is, for example, a salt. Salts can include, but are not limited to, alkali metal salt, alkaline earth metal salt, and combinations thereof. Alkali metal salts are, for example, salts of lithium, sodium, potassium, rubidium, cesium, francium, or any combination thereof.

In some aspects, alkali metal salts include, for example, alkali metal fluorides, chlorides, bromides, iodides, sulfates, bisulfates, phosphates, monohydrogen phosphates, dihydrogen phosphates, carbonates, monohydrogen carbonates, acetates, citrates, lactates, pyruvates, silicates, ascorbates, or any combination thereof.

In some aspects, alkaline earth metal salts include, for example, salts of beryllium, magnesium, calcium, strontium, barium, radium, or any combination thereof. In some aspects, alkaline earth metal salts include, for example, alkaline metal fluorides, chlorides, bromides, iodides, sulfates, bisulfates, phosphates, monohydrogen phosphates, dihydrogen phosphates, carbonates, monohydrogen carbonates, acetates, citrates, lactates, pyruvates, silicates, ascorbates, or any combination thereof.

In some aspects, salts include, for example, inorganic salts, such as inorganic alkali metal salts and inorganic alkaline earth metal salts that do not contain carbon.

In some aspects, salts include, for example, organic salts, such as organic alkali metal salts and organic alkaline earth metal salt that contain carbon.

In some aspects, the additional ingredient(s) are, for example, contained in the water soluble laundry detergent product in an amount ranging from about 0.00001% by weight to about 10% by weight, based on the weight of the water soluble laundry detergent product.

Method of Preparing Water Soluble Laundry Detergent Product

In some aspects, provided herein is a process for preparing a water soluble laundry detergent product, comprising: a. mixing from about 20% to about 80% by weight of a gel with from about 10% to about 80% by weight of a solidifying agent to form a mixture; b. adding a pH modifier to the mixture in an amount of about 3% to about 15% by weight of the gel to form a solid layer; and c. coating one or more sides of one or more non-fibrous sheets with the solid layer. In some aspects, the gel comprises from about 40% to about 80% by weight of one or more surfactants.

In some aspects, provided herein is a process for preparing a water soluble laundry detergent product, comprising: a. mixing from about 20% to about 80% by weight of a gel with from about 10% to about 80% by weight of one or more polyethylene glycols to form a mixture; b. adding monoethanolamine to the mixture in an amount of about 3% to about 15% by weight of the gel to form a solid layer; and c. coating one or more sides of one or more non-fibrous sheets with the solid layer. In some aspects, the gel comprises from about 40% to about 80% by weight of one or more surfactants. In some aspects, the one or more polyethylene glycols have a weight average molecular weight (g/mol) ranging from about 1000 to about 8000.

In some aspects, the process further comprises attaching a flat surface of two or more of the coated non-fibrous sheets together.

EXAMPLES

Example 1: Sample Gel Formulation

A gel solution was prepared by adding a polyethylene glycol with a molecular weight of 400 grams per mole (g/mol) to water in an amount described in Table 1 to form a mixture. After mixing, Non-ionic Surfactant 1, Non-ionic Surfactant 2, Anionic Surfactant 1, and Anionic Surfactant 2 were added to the gel solution in the amounts listed in Table 1 below. After adding the surfactants, a pH Modifier was added to the gel solution in the amount listed in Table 1 below. The gel solution was then mixed until a desired consistency was achieved.

TABLE 1

| Component | Wt % in formula | Total % in product |
|---|---|---|
| | Surfactant portion | |
| Non-ionic Surfactant 1 | 15-30 | 40-80 |
| Anionic Surfactant 1 | 30-45 | |
| Non-ionic Surfactant 2 | 2-12 | |
| Anionic Surfactant 2 | 2-10 | |
| | PEG portion | |
| Water | 5-15 | 10-30 |
| PEG 400 | 5-15 | |
| | Other | |
| pH Modifier | 5-15 | 5-15 |

Example 2: Sample Solid Layer Formulation

A solid layer mixture was prepared by combining 275 grams (g) of polyoxyethylene (100) stearyl ether and 25 g of PEG-75 in a large vessel and heating to 85° C. until the solids melted. Once the mixture was melted, 85 g of C14-C15 alcohol ethoxylate 7 EO and 335 g of a solid sodium linear alkylbenzene sulfonate were added to the heated mixture and allowed to thoroughly mix. After mixing, 210 g of borax decahydrate, 115 g of anhydrous sodium carbonate, 2 g optical brightener, 28 g sodium polyacrylate, 4 g blue HP dye (1% solution), 5 g Tetrasodium EDTA, and 9 g perfume were added. The resulting mixture was thoroughly mixed at 85° C. until the desired viscosity was achieved. Optionally, the viscosity may be adjusted by adding up to 6% by weight water. After mixing, around 1-100 g of the molten solid layer was coated onto a nonwoven non-fibrous sheet where it solidified upon cooling.

Example 3: Coating Process

The formulation of example 2 is blended at elevated temperatures (120° F.-190° F.) using standard mix tanks and agitation. Order of addition can vary based on mixing and heating capabilities of the system. A Gravure/Kiss type of application process is used to apply the molten solid layer to the non-fibrous sheet where the sheet is passed over by a rotating cylinder that has been coated with the solid layer mixture. The cylinder is partially submerged in a trough of molten solid layer composition and rotates to coat itself and thereby transfer the molten solid layer to the sheet substrate. The amount of solid layer composition coated onto the sheet can be modified by adjusting the machine's parameters. For example, a solid layer weight of 5-20 grams can be achieved in a 5-inch by 6-inch sheet area when process parameters are: Line speed 5-30 feet/second; Cylinder speed 5-30 rpms; Trough temperature 120° F.-190° F.; Cylinder temperature 120° F.-190° F. The molten solid layer can also be coated using a slot dye system that precisely meters the correct solid layer weights on to the area of the nonwoven sheet substrate.

Example 4: Solid Layer Formulations Containing Different PEG and Gel Concentrations Nine samples were prepared by mixing the gel formulation described in Example 1 with polyethylene glycols (PEG) having molecular weights of 1000, 4000, and 8000, respectively, and in the concentrations shown in Table 2. After mixing, the solution was poured into a puck mold and allowed to sit at room temperature for 15 minutes or until a solid puck was formed. Once the solution had coalesced, the solid puck's sweating and dissolution properties were measured.

The sweating property of the final product was measured by placing the solid puck on a stack of paper and the distance of liquid absorbed into the paper stack was measured. Sweating is undesirable because it could lead to premature dissolution of the laundry sheet and poor storage capabilities.

The dissolution of the final product was measured by placing the solid puck into a water bath at 50° C. for 20 minutes and the time of dissolution was recorded. The results for each solution are shown in Table 2.

Samples made with PEG 1000 (solutions A1-A3) were either unable to form a solid (A1), or resulted in too much sweating (A2 and A3), suggesting an unstable solid.

Samples made with PEG 4000 (B1-B3) all formed solid pucks. However, at a lower PEG concentrations (B1), the sample displayed sweating properties. At higher PEG concentrations (B2-B3), the samples suffered from long dissolution times, remaining undissolved after a 20 minute period.

Samples made with PEG 8000 (C1-C3) all formed solid pucks and displayed no sweating characteristics. Sample C1 with a lower PEG concentration displayed lower dissolution times than those at higher PEG concentrations (C2-C3). The results show that a lower concentrations of a higher molecular weight PEG can support a higher concentration of gel while exhibiting desired dissolution time, maintaining solid properties, and avoiding sweating.

TABLE 2

| Sample | PEG | PEG Concentration (%) | Gel Concentration (%) | Solid | Sweating (cm) | Dissolution (min) |
|---|---|---|---|---|---|---|
| A1 | PEG | 25 | 75 | No | N/A | |
| A2 | 1000 | 50 | 50 | Yes | 4.1 | 14 |
| A3 | | 75 | 25 | Yes | 3.5 | |

TABLE 2-continued

| Sample | PEG | PEG Concentration (%) | Gel Concentration (%) | Solid | Sweating (cm) | Dissolution (min) |
|---|---|---|---|---|---|---|
| B1 | PEG | 25 | 75 | Yes | 0.1 | |
| B2 | 4000 | 50 | 50 | Yes | 0 | |
| B3 | | 75 | 25 | Yes | 0 | |
| C1 | PEG | 25 | 75 | Yes | 0 | 14.3 |
| C2 | 8000 | 50 | 50 | Yes | 0 | |
| C3 | | 75 | 25 | Yes | 0 | >15 |

What is claimed is:

1. A water soluble laundry detergent product comprising one or more non-fibrous sheets and at least one solid layer, wherein the at least one solid layer comprises a gel and a solidifying agent and is coated on one or more sides of the one or more non-fibrous sheets, is disposed between two or more of the non-fibrous sheets, or a combination thereof, wherein the gel is present in an amount of from about 20% to about 80% by weight of the solid layer, and the solidifying agent is present in an amount of from about 20% to about 80% by weight of the solid layer, wherein the solidifying agent comprises polyethylene glycol having a weight average molecular weight of about 8000 g/mol, wherein the gel comprises one or more surfactants, and wherein the solidifying agent is solid at room temperature, has a melting point of about 50° C. or higher, and is water soluble.

2. The laundry detergent product according to claim 1, wherein the gel is present in an amount of from about 65% to about 80% by weight of the solid layer and wherein the solidifying agent is present in an amount of from about 20% to about 30% by weight of the solid layer.

3. The laundry detergent product according to claim 1, wherein the gel comprises from about 40% to about 80% by weight of one or more surfactants.

4. The laundry detergent product according to claim 3, wherein the one or more surfactants are selected from anionic surfactants, non-ionic surfactants, and mixtures thereof.

5. The laundry detergent product according to claim 1, wherein the solid layer is aerated, contains water-soluble particles, or both.

6. The laundry detergent product according to claim 1, wherein the product comprises from about 1 to about 20 non-fibrous sheets.

7. The laundry detergent product according to claim 1, wherein the product has a thickness of from about 0.1 cm to about 3 cm.

8. The laundry detergent product according to claim 1, wherein the one or more non-fibrous sheets are woven sheets, non-woven sheets, and mixtures thereof.

9. The laundry detergent product according to claim 1, wherein the one or more non-fibrous sheets are non-woven, water soluble, and comprise polyvinyl alcohol, polyvinyl acetate, cellulose, wood pulp, or mixtures thereof.

10. The laundry detergent product according to claim 1, wherein the one or more non-fibrous sheets comprise one or more ingredients selected from starch, one or more surfactants, enzymes, polymers, chelators, buffers, perfumes, optical brighteners, neutralizers, builders, and mixtures thereof.

11. The laundry detergent product according to claim 1, wherein the product has a shape selected from a rectangular shape, a square shape, a circular shape, an oval shape, a hexagon shape, a 2-dimensional bear shape, 2-dimensional cartoon image shapes of a plant or animal, and combinations thereof.

12. The laundry detergent product according to claim 1, wherein the product is folded or rolled.

13. The laundry detergent product according to claim 12, wherein the product is perforated.

14. The laundry detergent product according to claim 1, wherein the product dissolves in water at room temperature in from about 2 minutes to about 30 minutes.

15. A process for preparing a water soluble laundry detergent product according to claim 1, comprising:

a. mixing from about 20% to about 80% by weight of the gel with from about 20% to about 80% by weight of the polyethylene glycol to form a mixture;

b. adding monoethanolamine to the mixture in an amount of about 3% to about 15% by weight of the gel to form a solid layer; and c. coating one or more sides of the one or more non-fibrous sheets with the solid layer.

16. A water soluble laundry detergent product comprising one or more non-fibrous sheets and at least one solid layer, wherein the at least one solid layer comprises a gel and polyethylene glycol having a weight average molecular weight of about 8000 g/mol, wherein the at least one solid layer is coated on one or more sides of the one or more non-fibrous sheets, is disposed between two or more of the non-fibrous sheets, or a combination thereof, wherein the gel is present in an amount of from about 50% to about 80% by weight of the solid layer, and the polyethylene glycol is present in an amount of from about 20% to about 50% by weight of the solid layer, and wherein the gel comprises one or more surfactants.

17. The laundry detergent product according to claim 16, wherein the gel comprises from about 40% to about 80% by weight of one or more surfactants.

18. The laundry detergent product according to claim 16, wherein the one or more surfactants are selected from anionic surfactants, non-ionic surfactants, and mixtures thereof.

19. The laundry detergent product according to claim 16, wherein the solid layer is aerated, contains water-soluble particles, or both.

* * * * *